(12) United States Patent
Kohler (10) Patent No.: US 10,645,257 B2
(45) Date of Patent: May 5, 2020

(54) INITIALIZATION METHOD AND IMAGE-TRANSFERRING SYSTEM

(71) Applicant: Scholly Fiberoptic GmbH, Denzlingen (DE)

(72) Inventor: Alexander Kohler, Freiburg (DE)

(73) Assignee: Schölly Fiberoptic GmbH, Denzlingen (DE)

( * ) Notice: Subject to any disclaimer, the term of this patent is extended or adjusted under 35 U.S.C. 154(b) by 0 days.

(21) Appl. No.: 16/361,844

(22) Filed: Mar. 22, 2019

(65) Prior Publication Data

US 2019/0297229 A1    Sep. 26, 2019

(30) Foreign Application Priority Data

Mar. 23, 2018    (DE) .......................... 10 2018 107 012

(51) Int. Cl.
*H04N 5/073* (2006.01)
*H04N 5/232* (2006.01)
*H04N 5/247* (2006.01)

(52) U.S. Cl.
CPC ....... *H04N 5/0733* (2013.01); *H04N 5/23206* (2013.01); *H04N 5/247* (2013.01)

(58) Field of Classification Search
CPC ... H04N 5/0733; H04N 5/23206; H04N 5/247
USPC ........................................................ 348/518
See application file for complete search history.

(56) References Cited

U.S. PATENT DOCUMENTS

| | | | | |
|---|---|---|---|---|
| 5,223,932 A * | 6/1993 | Thomas | ................... | H04N 5/30 348/162 |
| 5,243,425 A | 9/1993 | Thompson | | |
| 5,402,148 A * | 3/1995 | Post | ....................... | A61B 5/044 345/213 |
| 6,141,062 A * | 10/2000 | Hall | ..................... | H04N 5/4401 348/565 |
| 6,449,007 B1 * | 9/2002 | Yokoyama | ......... | H04N 5/23209 348/73 |
| 6,593,034 B1 * | 7/2003 | Shirasaki | .................. | G03F 1/64 355/75 |

(Continued)

FOREIGN PATENT DOCUMENTS

DE    69216060    7/1997
DE    10101064    1/2008

*Primary Examiner* — Michael Lee
(74) *Attorney, Agent, or Firm* — Volpe and Koenig, P.C.

(57) ABSTRACT

An initialization method for initializing a transfer of a recording image data stream from an image sensor of an image recording apparatus to a display unit, wherein initially a display image data stream in the form of a test image is transferred from an image processing apparatus to the display unit and a recording image data stream is transferred from an image recording apparatus to the image processing apparatus. A changeover of a reproduction on the display unit to the recording image data stream is preceded by a correction value being calculated for a phase shift between the display image data stream and the recording image data stream and being transferred to the image recording apparatus, and the recording image data stream is phase-shifted by the correction value. Subsequently the display image data stream is changed over to the recording image data stream (21) and the image recorded by the image sensor or the sequence of images is reproduced with the display unit.

14 Claims, 4 Drawing Sheets

(56) References Cited

U.S. PATENT DOCUMENTS

| | | | |
|---|---|---|---|
| 6,636,269 B1 * | 10/2003 | Baldwin | G09G 5/393 348/500 |
| 6,717,609 B2 | 4/2004 | Sugimoto et al. | |
| 2008/0143874 A1 | 6/2008 | Mizutani | |
| 2013/0021530 A1 | 1/2013 | Takahashi | |

* cited by examiner

INITIALIZATION METHOD AND IMAGE-TRANSFERRING SYSTEM

INCORPORATION BY REFERENCE

The following documents are incorporated herein by reference as if fully set forth: German Patent Application No. DE 102018107012.8, filed Mar. 23, 2018.

BACKGROUND

The invention relates to an initialization method for initializing a transfer of a recording image data stream from an image sensor of an image recording apparatus to a display unit, wherein initially a display image data stream is transferred from an image processing apparatus to the display unit and a recording image data stream is transferred from the image recording apparatus to the image processing apparatus, wherein subsequently the display image data stream is changed over to the recording image data stream and the image recorded by the image sensor or the sequence of images is reproduced with the display unit. Preferably, the image recording apparatus is an electronic endoscope having an integrated image sensor. More preferably, the image recording apparatus is a camera head to which an endoscope and/or a probe is/are connectable or connected.

The invention also relates to an image-transferring system having an image processing apparatus and having at least one image recording apparatus with an image sensor. The image-transferring system can be configured in particular as an endoscopy system.

Such initialization methods are known and are used to change over the display image data stream displayed on a display unit, which display image data stream can depict a test image and/or a starting image, for example, to a recording image data stream, which can depict an image or a sequence of images of a scene recorded with the image sensor (that is to say a live image). The image-transferring systems used in this case have an image processing apparatus that is separably connected to an image recording apparatus. There is therefore the possibility of connection of the image recording apparatus to the image processing apparatus resulting in a phase shift between the display image data stream and the recording image data stream. The image recording apparatus is normally supplied with power and/or switched on only upon connection. The resultant phase shift can, however, lead to the display unit changing to a search mode and/or even switching off during the changeover from the display image data stream to the recording image data stream, owing to an absence of signal over too long a phase. This is not desirable, however.

To avoid this switching off and/or the initiation of a search mode on an image data source, it has been proposed that the image sensor and the display unit have a data buffer set up between them that equalizes such a phase offset. This data buffer can be a ring memory in this case, in which the recording image data stream is continually read in and from which the display image data stream to be forwarded to the display unit is continually read out, the phase shift between the two image data streams being able to be matched accordingly. The use of a data buffer has the disadvantage that a time delay occurs in the recording image data stream transfer to the display unit, however. This time delay is all the greater the greater the phase shift between the display image data stream and the recording image data stream. Therefore, there is the possibility of a tolerable and/or permissible time delay being exceeded. Such a time delay can be particularly critical in situations during a medical intervention when for example an endoscopic operation or an examination of a cavity in a patient is performed by a user.

SUMMARY

The invention is thus based on the object of eliminating the problem of the phase shift between the display image data stream and the recording image data stream.

A way of achieving this object is provided according to the invention by an initialization method of the type cited at the outset having one or more features of the invention. In particular, the object is achieved according to the invention by providing an initialization method of the type cited at the outset, wherein the changeover is preceded by a correction value being calculated for a phase shift between the display image data stream and the recording image data stream and being transferred to the image recording apparatus, and wherein the recording image data stream is phase-shifted by the correction value before the changeover. In this manner, matching of the two aforementioned image data streams is possible, which leads to the display unit not changing to the search mode and a time delay for the depiction of the recording image data stream recorded by the image sensor on the display unit being able to be prevented or kept as short as possible. It is therefore possible for a scene recorded by the image recording apparatus to be reproduced for the user on the display unit almost in real time. The time delay that can be achieved thereby is at least short enough for the user to hardly or not be aware of it.

Advantageous developments of the invention are described below, said developments being combinable individually or in any combination with the method noted above.

In one configuration of the invention, there can be provision that the image recording apparatus transmits a recording sync signal generated by the image recording apparatus to an image processing apparatus, the image processing apparatus is used to perform a comparison of a phase between the recording sync signal and a display sync signal generated in the image processing apparatus independently thereof and to determine a phase shift value therefrom, a correction value is generated from the phase shift value by the image processing apparatus and is transmitted to the image recording apparatus, a processing of the correction value in the image recording apparatus generates a corrected recording sync signal and/or sends it to the image sensor.

The incorporation of a recording sync signal and a display sync signal allows a particularly simple way of comparing the phases of the image data streams. Sync signals are known in communications engineering and are normally used for synchronizing two or more processes. The recording sync signal can also be contained in the recording image data stream. However, it can also be a signal that is separate from the recording image data stream. In particular, there can be provision in this case that performance of the initialization method can be followed by the phase shift value between the corrected recording sync signal and the display sync signal being smaller than previously, that is to say smaller than the uncorrected phase shift value. Preferably, performance of the initialization method can be followed by the phase shift value between the corrected recording sync signal and the display sync signal being almost zero or zero. Therefore, particularly precise matching of the image data streams that is nevertheless linked to the transfer of small volumes of data is possible.

In one configuration of the invention, matching of a phase of the image data streams can be performed if the phase shift value is +/−1 degree, in particular at least +/−45 degrees, in particular at least +/− 90 degrees, in particular at least +/−180 degrees, in particular at least +/−270 degrees. As an alternative or in addition, there can be a provision that the correction value is identical to the phase shift value and/or that the correction value is smaller than the phase shift value. Preferably, the method steps of the initialization method can be performed repeatedly, in particular so that matching between the corrected recording sync signal and the display sync signal is effected iteratively. More preferably, it is possible that the phase shift value and/or the correction value is/are converted into a unit of time that preferably corresponds to a time delay. There can be provision that the phase shift value is $\Delta\varphi = \varphi_{image\ recording\ apparatus}(t) - \varphi_{image\ processing\ apparatus}(t)$.

According to one configuration of the invention, a or the aforementioned recording sync signal can be transmitted together with the recording image data stream recorded by an image sensor from the image recording apparatus to the image processing apparatus. Alternatively or additionally, the recording sync signal can be transmitted from the image recording apparatus to the image processing apparatus independently of the recording image data stream, in particular via a different data transfer line than for the transmission of the recording image data stream. This independent data transfer line, which is preferably a communication line, can alternatively or additionally be set up for transferring the phase shift value and/or the correction value.

It can be particularly expedient if a or the aforementioned recording sync signal and/or a or the aforementioned display sync signal is/are in each case a V-SYNC signal and/or an H-SYNC signal and/or a master clock signal and/or a pixel clock signal. The V-SYNC signal can determine a start of a first row of an image in the vertical direction. The H-SYNC signal can determine a start of a first row of an image in the horizontal direction. A master clock signal can relate to a clock signal delivered by a clock generator.

In one configuration of the initialization method, the recording sync signal, in particular the corrected recording sync signal, can be used for time-controlled transmission of the recording image data stream from the image sensor and/or from the image recording apparatus to the image processing apparatus and/or to the display unit.

Alternatively or additionally, the display sync signal can be used for time-controlled transmission of the display image data stream and/or the recording image data stream by the image processing apparatus to the display unit.

Preferably, a transfer of the display image data stream from the image processing apparatus to the display unit does not have to be interrupted during the performance of the initialization method. Therefore, the periodicity of the display image data stream can remain unchanged during the initialization method.

According to a further configuration of the initialization method, the recording sync signal can be derived from an image recording clock signal generated by an image recording clock generator. In particular, this can be performed such that the recording sync signal has at least one sync pulse periodically recurring after a period of time has elapsed, said sync pulse preferably repeating after a stipulated or stipulable number of single pulses. Preferably, the sync pulse can determine the beginning of an image row and/or an image start of an image produced by the image recording apparatus and/or an arbitrary first pixel, in particular the same in each image, of an image.

Alternatively or additionally, the image display sync signal can be derived from an image processing clock signal generated by an image processing clock generator. In particular, this can be performed such that the display sync signal has at least one sync pulse periodically recurring after a period of time has elapsed, said sync pulse preferably repeating after a stipulated or stipulable number of single pulses. Preferably, the sync pulse can determine the beginning of an image row and/or an image start of an image produced by the image processing apparatus and/or an arbitrary first pixel, in particular the same in each image, of an image.

It is thus possible that the image recording apparatus and the image processing apparatus each have a separate clock generator. The two clock generators can have the same or a different frequency. The matching and/or a synchronization of the recording image data stream and the display image data stream can be effected even though the clock signals of the clock generators can remain unchanged. In the case of previously known methods, it has been proposed that at least one of the clock signals be changed to achieve matching of the periodicities. This solution is distinctly more complex, however, and requires a voltage-controlled change of the frequency of at least one of the clock generators until an approximate in-phase condition is achieved.

Preferably, the two sync pulses can take place at the same time or almost at the same time after performance of the initialization method.

In one configuration of the invention, the image processing apparatus can be used to store a phase shift threshold value, wherein the phase shift value being above the phase shift threshold value results in a corrected recording sync signal being generated. This has the advantage that the initialization method can be terminated if there is only a short time delay that requires no, in particular further, matching. Alternatively or additionally, it is thus possible for the phase shift value being below the phase shift threshold value to result in the initialization method being terminated. Preferably, the initialization method can be terminated if a time delay resulting from the phase shift is 80 milliseconds or less, more preferably 50 milliseconds or less, more preferably 25 milliseconds or less, more preferably 10 milliseconds, more preferably 1 millisecond or less.

According to an advantageous configuration of the initialization method, a respective counter that is set up to generate the sync signals can be changed in the image recording apparatus and in the image processing apparatus, in each case on the basis of a or the clock signal generated by a or the clock generator. The counter can in this case be changed, in particular decremented, in particular on the basis of a phase angle, wherein the matching of the sync signals involves the counter of the image recording apparatus being overwritten, in particular being overwritten with the value of the counter of the image processing apparatus.

Alternatively or additionally, an image display clock signal generated by a or the aforementioned image processing clock generator and an image recording clock signal generated by a or the image recording clock generator can remain unchanged during the initialization method. This has the advantage that no complex recalibration and/or change of timing of the clock generators is required.

The invention further relates to an image-transferring system, which can be configured in particular as an endoscopy system, having an image processing apparatus and having at least one image recording apparatus with an image sensor having the features of the coordinate claim. In particular, the aforementioned object is achieved in this case by providing that the image-transferring system be set up for performing the initialization method according to the invention as described and claimed herein. In this respect, the advantages previously cited in regard to the initialization method apply to the image-transferring system in the same manner.

Advantageous configurations of the image-transferring system are described below and are combinable alone or in combination with the features of the coordinate claim.

In one configuration of the invention, the image-transferring system can have at least two image recording apparatuses. In particular, the image recording apparatuses can be in the form of at least two camera heads connected to an endoscope and/or to a probe or in the form of two electronic endoscopes. Alternatively or additionally, a camera head and an electronic endoscope can also be started up together. The image-transferring system can be set up to perform the initialization method according to the invention, as described and claimed herein, for each of the at least two image recording apparatuses, in particular at the same time. Preferably, the image-transferring system can be set up such that performance of the initialization method according to the invention is followed by the recording image data streams of the two image recording apparatuses each being matched, in particular in terms of their phase, to the display image data stream of the image processing apparatus and/or such that at least two recording sync signals, in particular the phase thereof, are matched to the display sync signal.

In one configuration of the image-transferring system, the image recording apparatus and the image processing apparatus can each have a clock generator, preferably in each case a clock generator in the form of a quartz oscillator, for generating a clock signal. A clock signal can be made up of successively occurring, regularly starting single pulses.

Alternatively or additionally, the image recording apparatus and the image processing apparatus can each have a monitoring unit, preferably configured as a field programmable gate array. Preferably, an image recording monitoring unit can receive an image recording clock signal from the image recording clock generator and can generate a recording sync signal therefrom.

According to one development, an image processing monitoring unit can receive an image display clock signal from the image processing clock generator and can generate a display sync signal therefrom. Alternatively or additionally, the image processing monitoring unit can be set up to perform a comparison of a phase between a recording sync signal and a display sync signal and to determine a phase shift value therefrom, wherein the image processing monitoring unit is set up to generate a correction value from the phase shift value and to transmit it to the image recording monitoring unit, wherein the image recording monitoring unit is set up to generate a corrected recording sync signal therefrom and to transmit it to the image sensor. This allows the image sensor to transmit its recording image data stream in sync or approximately in sync with the display image data stream in future, in particular after the display unit has changed over to the recording image data stream.

According to an advantageous configuration, the image recording apparatus can be configured as an endoscopy device having a camera head and an endoscope, connected, in particular separably, to the camera head, and/or a probe, connected, in particular separably, to the camera head. It can be preferred in this case for the endoscope and/or the probe to be removable from the image recoding apparatus. Further, the image recording apparatus can be an electronic endoscope having an image sensor integrated therein. The image sensor can be arranged in a distal region (chip-in-tip) or in a grip of the endoscope (chip-in-scope) in this case.

There can be provision that the image processing apparatus is configured as a camera control unit (CCU), in particular wherein the image recording apparatus is physically separable from the image processing apparatus by virtue of the image recording apparatus being connected or connectable to the image processing apparatus by a data transfer line for transferring an image data stream and/or a sync signal. Preferably, the image recording apparatus can be connected or connectable to the image processing apparatus by a first data transfer line for transferring the image data stream and a second data transfer line, in particular independent of the first data transfer line, for transferring sync signals.

In a further configuration of the invention, the image recording apparatus can have an image data stream input for receiving the recording image data stream of the image sensor and/or an image data stream output for forwarding the recording image data stream to the image processing apparatus. Alternatively or additionally, the image processing apparatus can have an image data stream input for receiving the recording image data stream from the image recording apparatus and/or an image data stream output for outputting the recording image data stream and/or the display image data stream to a display unit, in particular a display unit of the image-transferring system.

According to one configuration of the invention, a frequency of a or the clock generator of the image recording apparatus and a frequency of a or the clock generator of the image processing apparatus can differ from one another or be the same. Alternatively or additionally, there may be no provision for transfer of a display sync signal to the image recording apparatus. This facilitates a technical implementation of the alignment, since there is no requirement or provision for transfer of an image data stream and/or a clock signal from the image processing apparatus to the image recording apparatus.

BRIEF DESCRIPTION OF THE DRAWINGS

The invention will now be explained in more detail on the basis of exemplary embodiments, but is not restricted to these exemplary embodiments. Further exemplary embodiments are obtained from a combination of the features of individual or multiple claims among one another and/or with individual or multiple features of the exemplary embodiments.

In the figures.

DETAILED DESCRIPTION

FIGS. 1 to 4 and 6 to 9 show partially different variant embodiments of an image transfer system according to the invention that are each configured as an endoscopy system 1.

FIGS. 5 to 9 depict the individual steps of a variant embodiment of an initialization method according to the invention for initializing a transfer of a recording image data stream 21 from an image sensor 4 of an image recording apparatus 3 to a display unit 20.

Figure 1:
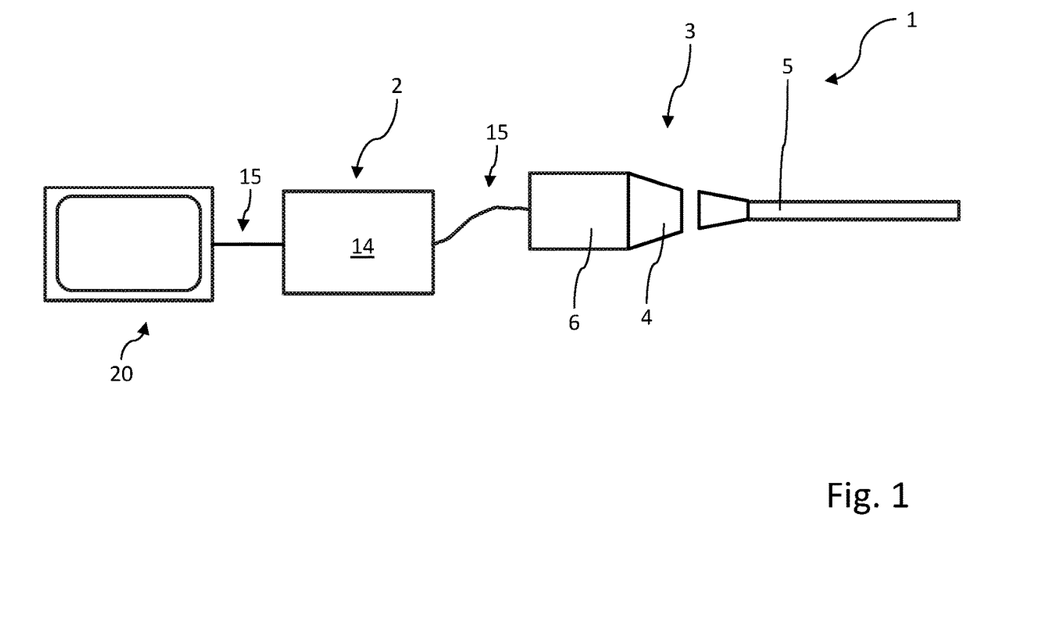
FIG. 1 shows a simplified depiction of an embodiment of an image-transferring system according to the invention configured as an endoscopy system.
Figure 2:
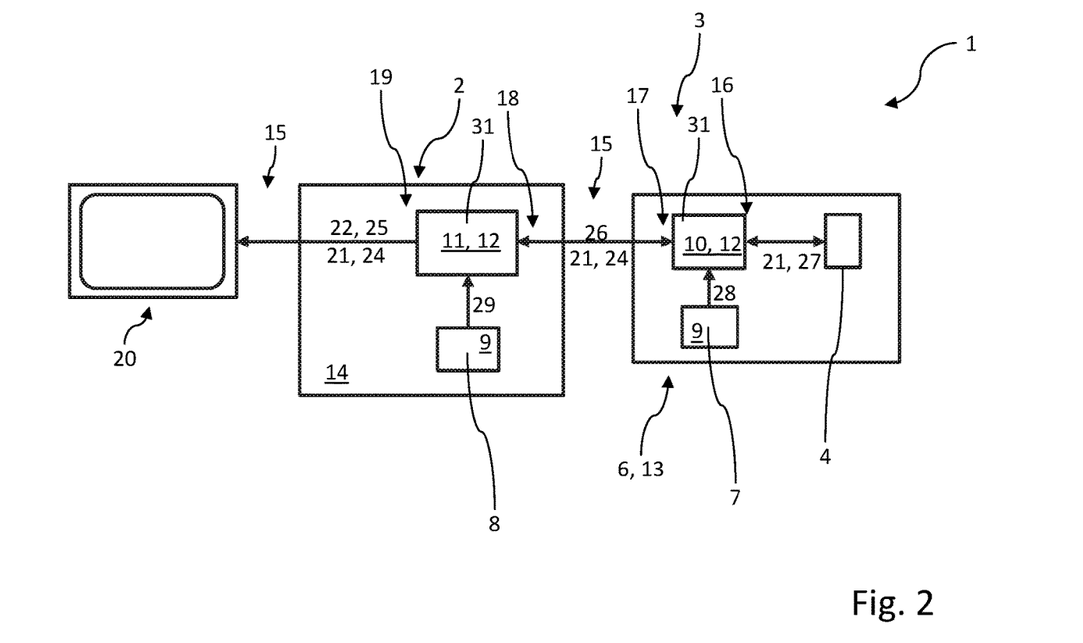
FIG. 2 shows a simplified depiction of a circuit diagram of the image-transferring system shown in FIG. 1.

The image-transferring system configured as an endoscopy system 1 has an image processing apparatus 2, which is preferably configured as a CCU 14. The endoscopy system 1 further has an image recording apparatus 3, which is configured as a camera head 6 having an endoscope 5, which is removable from the camera head 6. The endoscope 5 can be configured for example as a conventional, in particular electronics-free, endoscope 5. The camera head 6 has an image sensor 4. Alternatively or additionally, the endoscopy system 1 can have an image recording apparatus 3 that is configured as an electronic endoscope 13. Preferably, this can be a chip-in-the-tip endoscope, in the case of which the image sensor 4 is arranged in the region of the shaft tip of the endoscope, and/or can be a chip-in-scope endoscope, in the case of which the image sensor 4 is arranged in a grip. As an alternative or in addition to the endoscope 5, there can also be provision for a probe.

The image recording apparatus 3 is in this case in the form of a camera head 6 that has a coupling point that is set up to connect the endoscope 5 and/or the probe by a mating coupling point. Preferably, an endoscope 5 and/or a probe without an image sensor 4 of its own can thus be used in this case.

The image recording apparatus 3 is separably connectable or connected to the image processing apparatus 2 by a data transfer line 15. Preferably, a supply of power for the image recording apparatus 3 can be achieved via the data transfer line 15.

The image processing apparatus 2 has an image processing clock generator 8, which is preferably in the form of a quartz oscillator. The image processing apparatus 2 further has an image processing monitoring unit 11, which is preferably configured as a field programmable gate array (FPGA) 12. The image processing monitoring unit 11 receives an image display clock signal 29, generated by the image processing clock generator 8, that is used to generate a periodic display sync signal 25 by the image processing monitoring unit 11.

The image recording apparatus 3 has an image recording monitoring unit 10 of its own, which is preferably likewise configured as an FPGA 12. The image recording monitoring unit 10 is coupled to an image recording clock generator 7, which is likewise arranged in the image recording apparatus 3. The image recording clock generator 7 generates an image recording clock signal 28 by which a recording sync signal 24 is generable by the image recording monitoring unit 10.

Figure 3:
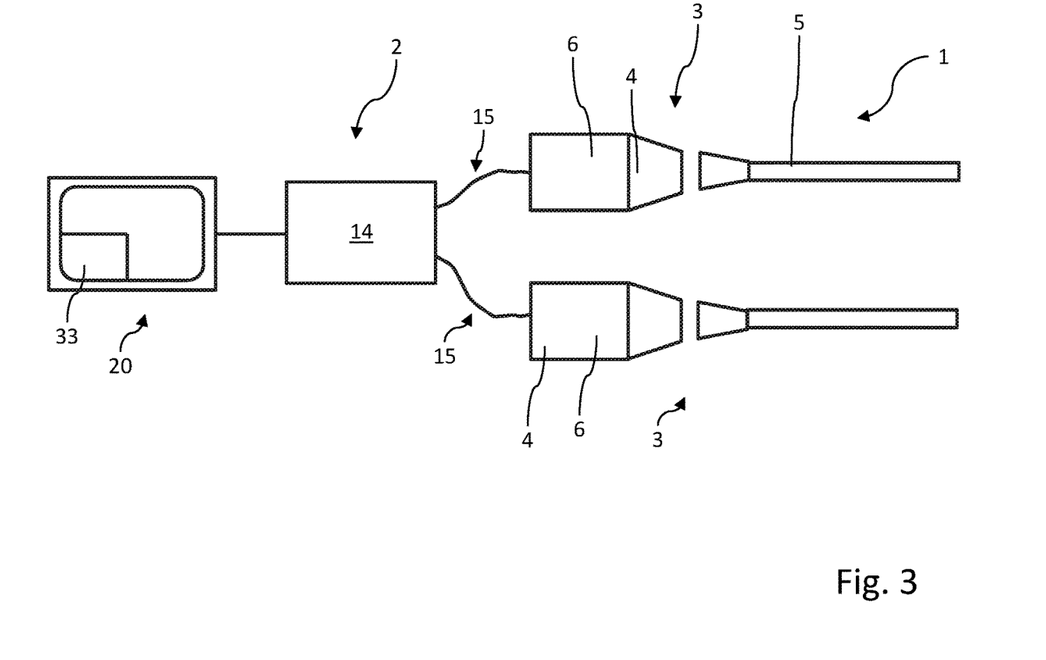
FIG. 3 shows a simplified depiction of a further embodiment of an image-transferring system according to the invention configured as an endoscopy system, with two image recording apparatuses.
Figure 4:
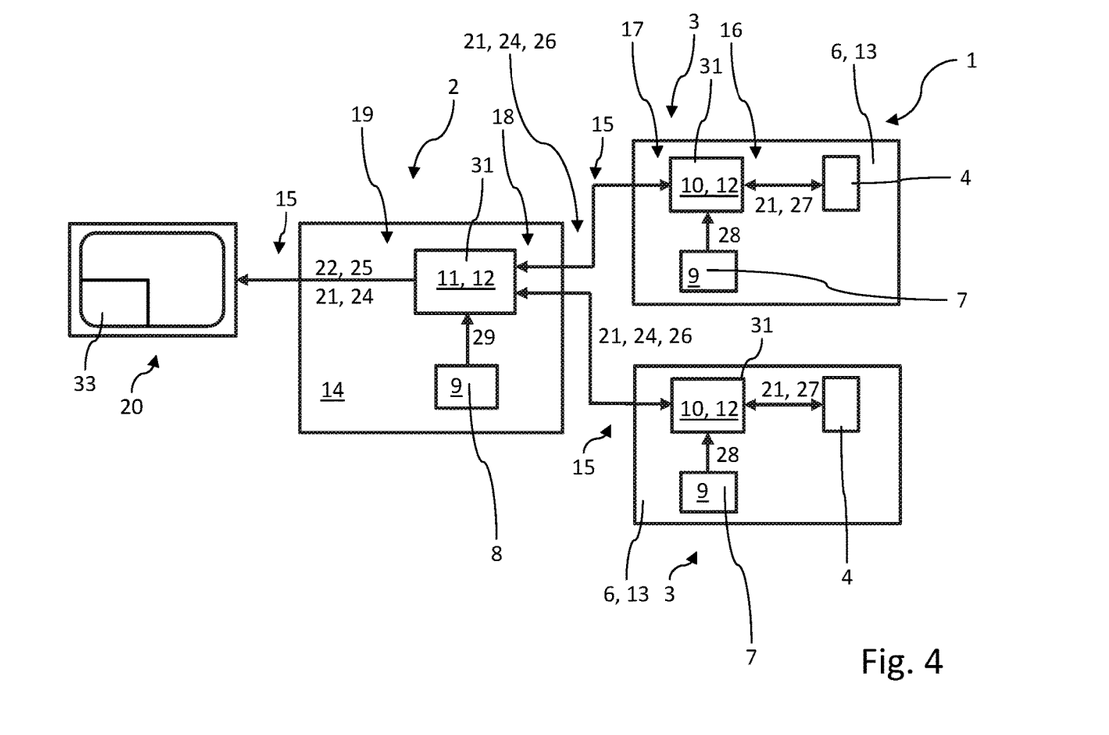
FIG. 4 shows a simplified depiction of a circuit diagram of the image-transferring system shown in FIG. 3.

The image-transferring system from FIGS. 3 and 4 has two image recording apparatuses 3, which are both separably connected to the same image processing apparatus 2 by a respective data transfer line 15. Otherwise, the design of the embodiment of the endoscopy system 1 from FIGS. 3 and 4 corresponds substantially to the design of the endoscopy system 1 from FIGS. 1 and 2. When two image recording apparatuses 3 are used, the images produced can be displayed on a display unit 20, such as a monitor, for example, as image-in-image 33. The image-in-image 33 allows the two recorded scenes to be reproduced at the same time in different display areas of the display unit 20, which can significantly simplify reading for the user. Alternatively or additionally, it is also possible for the scenes recorded by the two image recording apparatuses 3 to be depicted by multiple display units 20.

The image recording apparatuses 3 of the endoscopy system 1 from FIGS. 3 and 4 are likewise configured as camera heads 6. They each have an image recording clock generator 7, which is preferably likewise in the form of a quartz oscillator 9. The image recording clock generators 7 are coupled to a respective image recording monitoring unit 10, which is preferably configured as an FPGA 12.

The image recording apparatuses 3 can be separated from the image processing apparatus 2. Thus, when an image recording apparatus 3 is connected to the image processing apparatus 2 afresh, the image recording apparatus 3 and in this case in particular a recording image data stream 21 produced thereby are initiated. The image sensor 4 constantly records a scene that is in its field of view and sends the images of this scene to the image processing apparatus 2 via the image recording apparatus 3 by the recording image data stream 21.

However, when connecting the image recording apparatus 3 to the image processing apparatus 2, the user is unable to keep an eye on the phase of the display image data stream 22 in order to achieve concordance of the phases between display image data stream 22 and recording image data stream 21 by connecting the image recording apparatus 3 at a precise time.

For this reason, there will normally be a phase shift between the two image data streams 21, 22. The result of this is that the images recorded by of the image sensor 4 are reproducible by the display unit 20 only with a delay, owing to the phase shift, or the display unit 20 enters a search mode.

To avoid and/or eliminate a time delay arising on account of the aforementioned phase shift during reproduction of the images of a scene recorded by the image sensor 4 or the triggering of a search mode, the image-transferring system in the form of an endoscopy system 1 is designed to perform, in particular in automated fashion, an initialization method for initializing a transfer of the recording image data stream 21 from the image sensor 4 of the image recording apparatus 3 to the display unit 20. The performance of the individual method steps of the initialization method according to the invention is depicted more precisely on the basis of FIGS. 5 to 9.

In this case, a display image data stream 22 is initially transferred from the image processing apparatus 2 to the display unit 20. This display image data stream 22 can be a test image (cf. FIGS. 6 to 8), for example, which is preferably producible by the image processing monitoring unit 11 (cf. FIGS. 5 to 8).

Connection of the image recording apparatus 3 to the image processing apparatus 2 by the data transfer line 15 is followed by the image recording apparatus 3, which is preferably in the form of a camera head 6 or electronic endoscope 13, being started. As a result, there is also a transfer of the recording image data stream 21 from the image recording apparatus 3 to the image processing apparatus 2.

The changeover of the display image data stream 22 to the recording image data stream 21, that is to say in particular reproduction of a live image of the recorded scene, is preceded by a phase shift between the two image data streams 21 and 22 initially being detected. To this end, the image recording apparatus 3 has an image recording clock generator 7 that is coupled to the image recording monitoring unit 10 such that the latter generates a recording sync signal 24 from an image recording clock signal 28. The image recording clock generator 7 can in this case continually generate an, in particular constant, image recording clock signal 28. The recording sync signal 24 is transferred, in particular together with the recording image data stream 21, to the image processing monitoring unit 11 (cf. FIG. 6).

Figure 7:
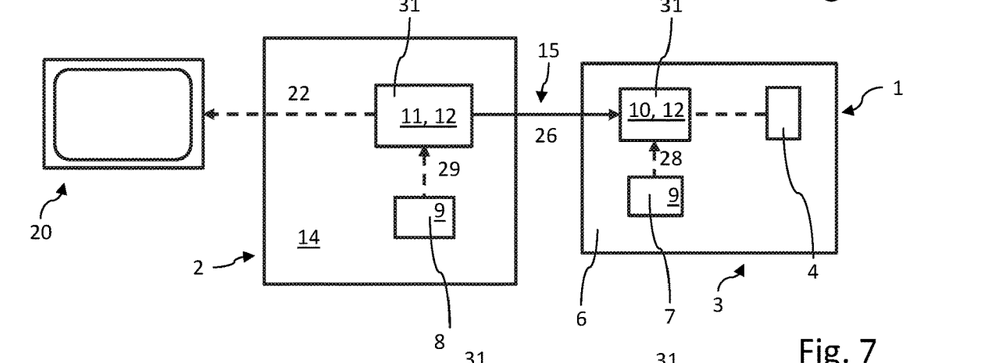
Figure 8:
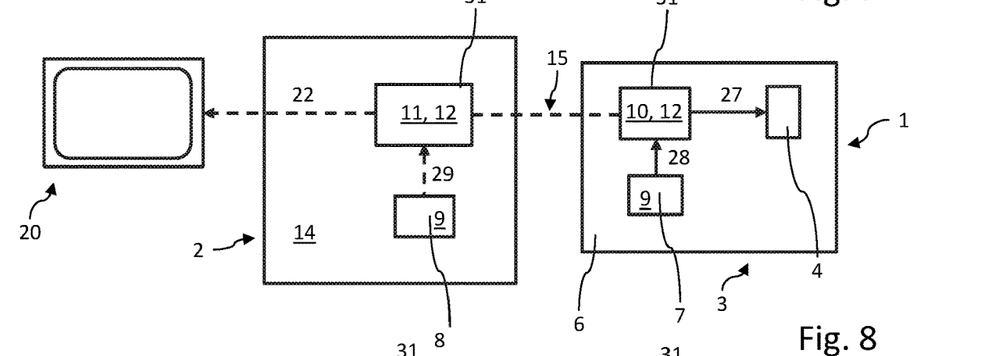

The image processing monitoring unit 11 is coupled to an image processing clock generator 8 such that the former generates a display sync signal 25 from an image display clock signal 29 generated from the image processing clock generator 8. Preferably, the image processing clock generator 8 continually generates an, in particular constant, image display clock signal 29. Subsequently, the image processing monitoring unit 11 generates a correction value 26 used for synchronizing and/or matching the two image data streams 21, 22 and, as shown in FIG. 7, transmits it to the image recording monitoring unit 10.

The correction value 26 can be generated for example by virtue of the image processing monitoring unit 11 being used to perform a comparison of the phases between the recording sync signal 24 and the display sync signal 25 and to ascertain a phase shift value 23 therefrom. The phase shift value 23 can correspond to or else be lower than the correction value 26. A lower correction value 26 allows iterative matching of the recording sync signal 24 to the display sync signal 25.

The correction value 26 is thus used for a phase shift of the recording sync signal 24 in the direction of the phase of the display sync signal 25.

Receipt of the correction value 26 is followed by the image recording monitoring unit 10 generating a corrected recording sync signal 27 and transmitting it to the image sensor 4. In this case, the image recording monitoring unit 10 can resort to an image recording clock signal 28 of the image recording clock generator 7 (cf. FIG. 8).

Figure 5:
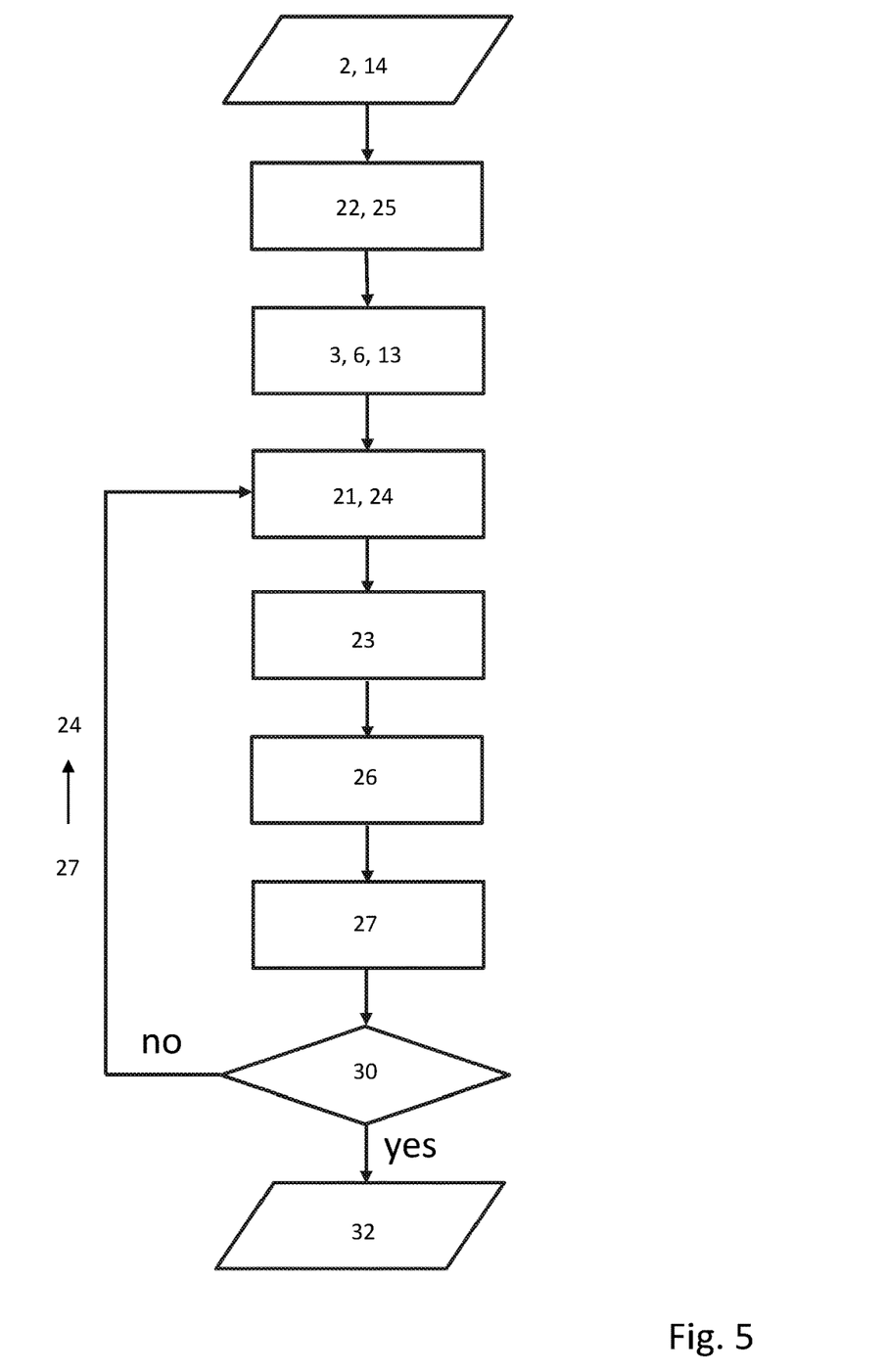
FIG. 5 shows a simplified schematic depiction of an embodiment of a method according to the invention for initializing a transfer of a recording image data stream from an image sensor to a display unit.
Figure 6:
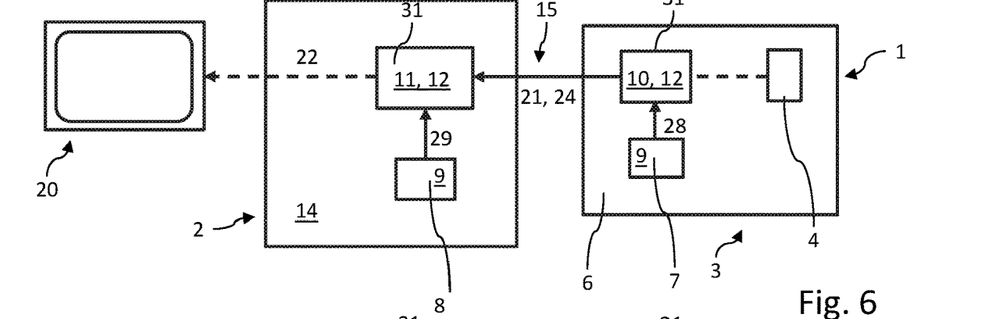
FIGS. 6 to 9 show a simplified schematic depiction of the individual method steps of the method according to the invention for initializing a transfer of a recording image data stream from an image sensor to a display unit shown in FIG. 5.
Figure 9:
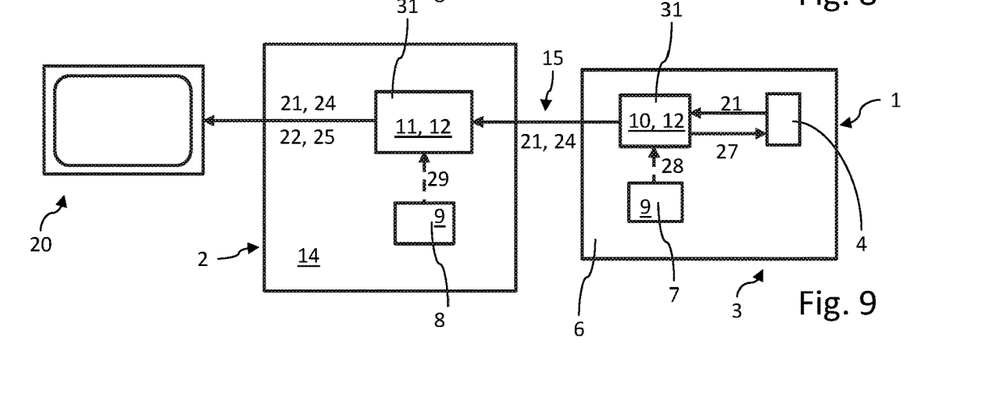

The correction of the recording sync signal 27 now allows an almost in-phase adjustment of the recording image data stream 21 and the display image data stream 22 to be achieved, so that said data streams are almost or precisely in sync, so that a live image is displayable almost without staggered timing (FIG. 9). As depicted in FIG. 5, there can be provision for the image processing monitoring unit 11 to be used to store, or to store, a phase shift threshold value 30. If the aforementioned ascertained phase shift value 23 is below the phase shift threshold value 30, then this can lead directly to an end 32 of the initialization method ("yes" path), since no time delay or a relatively short time delay occurs during the reproduction of the recorded image or the sequence of images on the display unit 20.

If, by contrast, the phase shift value 23 is above the phase shift threshold value 30 ("no" path), then, as shown in FIG. 5, the method according to the invention can be performed again. During this loop, the corrected recording sync signal 27 becomes the (new) recording sync signal 24 and the method steps described previously are repeated with this signal as the output signal. This permits better matching of the recording image data stream 21 to the display image data stream 22 to be performed.

The display sync signal 25 is therefore used for time-controlled transmission of the display image data stream 22 to the display unit 20. During the performance of the initialization method, a continuous transmission of the display image data stream 22 to the display unit 20 can be performed, since this data transmission is independent of the matching of the phase of the recording image data stream 21 to the phase of the display image data stream 22.

The recording sync signal 24 and the display sync signal 25 can each have a sync pulse that marks the beginning of an image row and/or of an image start of an image recorded by the image sensor 4 and/or of a test image. The sync pulses can thus be periodically recurrent at equal intervals of time. The sync pulses can accordingly represent a starting point of a counter 31 stored in the respective monitoring unit 10, 11. This counter 31 can be changed, in particular decremented, for example starting from the sync pulse until the end of a phase is reached. To correct the display sync signal 25, the counter 31 in the image recording monitoring unit 10 can be matched to the counter 31 of the image processing monitoring unit 11. As a result of a processing of the correction value 26 in the image recording monitoring unit 10, the original counter 31 of the image recording monitoring unit 11 can be overwritten by the value of the counter 31 of the image processing monitoring unit 11. Subsequently, the two counters 31 can thus be decremented almost in sync or in sync.

The image processing apparatus 2 has an image data stream input 18 by which the recording image data stream 21 is received by the image processing apparatus 2. The image processing apparatus 2 further has an image data stream output 19, by which the display image data stream 22 is transmitted to the display unit 20.

The image recording apparatus 3 has an image data stream input 16, by which the image sensor 4 of the camera head 6 and/or of the electronic endoscope 13 is connectable or connected. The image data stream input 16 can therefore be used to transmit the recording image data stream 21 of the image sensor 4 to the image recording monitoring unit 10. The image recording apparatus 3 further has an image data stream output 17, by which the recording image data stream 21 is transmittable to the image processing monitoring unit 11.

Image data stream inputs 16, 18 and/or image data stream outputs 17, 19 can be set up for connecting a or the data transfer line 15.

There can be provision for the recording sync signal 24 and/or the display sync signal 25 each to be a V-Sync signal and/or an H-Sync signal and/or a master clock signal and/or a pixel clock signal. The master clock signal can be for example an image recording clock signal 28 and/or an image display clock signal 29.

The invention thus relates in particular to an initialization method for initializing a transfer of a recording image data stream 21 from an image sensor 4 of an image recording apparatus 3 to a display unit 20, wherein initially a display image data stream 22 in the form of a test image is transferred from an image processing apparatus 2 to the display unit 20 and a recording image data stream 21 is transferred from an image recording apparatus 3 to the image processing apparatus 2, wherein changeover of a reproduction on the display unit 20 to the recording image data stream 21 is preceded by a correction value 26 being calculated for a phase shift between the display image data stream 22 and the recording image data stream 21 and being transferred to the image recording apparatus 3, and wherein the recording image data stream 21 is phase-shifted by the correction value 26, wherein subsequently the display image data stream 22 is changed over to the recording image data stream 21 and the image recorded by the image sensor 4 or the sequence of images is reproduced with the display unit 20.

LIST OF REFERENCE SIGNS

1 Endoscopy system
2 Image processing apparatus
3 Image recording apparatus
4 Image sensor
5 Endoscope (electronics-free endoscope) or optical probe
6 Camera head
7 Image recording clock generator
8 Image processing clock generator
9 Quartz oscillator
10 Image recording monitoring unit
11 Image processing monitoring unit
12 FPGA
13 Electronic endoscope
14 CCU
15 Data transfer line
16 Image data stream input of the image recording apparatus
17 Image data stream output of the image recording apparatus
18 Image data stream input of the image processing apparatus
19 Image data stream output of the image processing apparatus
20 Display unit
21 Recording image data stream
22 Display image data stream
23 Phase shift value
24 Recording sync signal
25 Display sync signal
26 Correction value
27 Corrected recording sync signal
28 Image recording clock signal
29 Image display clock signal
30 Phase shift threshold value
31 Counter
32 End of the method
33 Image-in-image

The invention claimed is:

1. An initialization method for initializing a transfer of a recording image data stream (21) from an image sensor (4) of an image recording apparatus (3) to a display unit (20), the method comprising:
  initially transferring a display image data stream (22) from an image processing apparatus (2) to the display unit (20) and transferring a recording image data stream (21) from the image recording apparatus (3) to the image processing apparatus (2);
  subsequently changing over the display image data stream (22) to the recording image data stream (21) and reproducing an image recorded by the image sensor (4) or a sequence of images with the display unit (20);
  prior to the step of changing over the display image data stream (22), calculating a correction value (26) for a phase shift between the display image data stream (22) and the recording image data stream (21) and transferring the correction value (26) to the image recording apparatus (3);
  phase-shifting the recording image data stream (21) by the correction value (26) before the step of changing over the display image data stream (22);
  the image recording apparatus (3) transmitting a recording sync signal (24) generated by the image recording apparatus (3) to the image processing apparatus (2);
  the image processing apparatus (2) performing a comparison of a phase between the recording sync signal (24) and a display sync signal (25) generated in the image processing apparatus (2) independently thereof and determining a phase shift value (23) therefrom;
  generating the correction value (26) from the phase shift value (23) by the image processing apparatus (2) and transmitting the correction value (26) to the image recording apparatus (3);
  a processing of the correction value (26) in the image recording apparatus (3) at least one of generating a corrected recording sync signal (27) or sending the corrected recording sync signal (27) to the image sensor (4);
  following performance of the initialization method, the phase shift value (23) between the corrected recording sync signal (27) and the display sync signal (25) being smaller than an uncorrected phase shift value; and
  wherein matching of a phase of the image data streams (21, 22) is performed if at least one of: (a) the phase shift value (23) is at least +/ 1 degree, (b) the correction value (26) is identical to the phase shift value (23), or (c) the correction value (26) is smaller than the phase shift value (23), and the method steps of the initialization method are performed repeatedly so that matching between the corrected recording sync signal (27) and the display sync signal (25) is effected iteratively.

2. The initialization method as claimed in claim 1, further comprising at least one of: (a) transmitting a recording sync signal (24) together with the recording image data stream (21) recorded by the image sensor (4) from the image recording apparatus (3) to the image processing apparatus (2) or transmitting the recording sync signal (24) from the image recording apparatus (3) to the image processing apparatus (2) independently of the recording image data stream (21) via a different data transfer line (15) than for a transmission of the recording image data stream (21).

3. The initialization method as claimed in claim 1, wherein at least one of the recording sync signal (24) or the display sync signal (25) are in each case at least one of a V-SYNC signal, an H-SYNC signal, a master clock signal, or a pixel clock signal.

4. The initialization method as claimed in claim 1, wherein at least one of: (a) the recording sync signal (24) is used for time-controlled transmission of the recording image data stream (21) from at least one of the image sensor (4) or from the image recording apparatus (3) to at least one of the image processing apparatus (2) or the display unit (20); (b) the display sync signal (25) is used for time-controlled transmission of the display image data stream (22) by the image processing apparatus (2) to the display unit (20); or (c) a transfer of the display image data stream (22) from the image processing apparatus (2) to the display unit (24) is not interrupted during a performance of the initialization method.

5. The initialization method as claimed in claim 1, wherein at least one of: (a) the recording sync signal (24) is derived from an image recording clock signal (28) generated by an image recording clock generator (7) and the recording sync signal (24) has at least one sync pulse periodically recurring after a period of time has elapsed; or (b) the display sync signal (25) is derived from an image display clock signal (29) generated by an image processing clock generator (8), and the display sync signal (25) has at least one sync pulse periodically recurring after a period of time has elapsed; and the two sync pulses take place at a same time or almost at the same time after performance of the initialization method.

6. An initialization method for initializing a transfer of a recording image data stream (21) from an image sensor (4) of an image recording apparatus (3) to a display unit (20), the method comprising:

initially transferring a display image data stream (22) from an image processing apparatus (2) to the display unit (20) and transferring a recording image data stream (21) from the image recording apparatus (3) to the image processing apparatus (2);

subsequently changing over the display image data stream (22) to the recording image data stream (21) and reproducing an image recorded by the image sensor (4) or a sequence of images with the display unit (20);

prior to the step of changing over the display image data stream (22), calculating a correction value (26) for a phase shift between the display image data stream (22) and the recording image data stream (21) and transferring the correction value (26) to the image recording apparatus (3);

phase-shifting the recording image data stream (21) by the correction value (26) before the step of changing over the display image data stream (22);

the image recording apparatus (3) transmitting a recording sync signal (24) generated by the image recording apparatus (3) to the image processing apparatus (2);

the image processing apparatus (2) performing a comparison of a phase between the recording sync signal (24) and a display sync signal (25) generated in the image processing apparatus (2) independently thereof and determining a phase shift value (23) therefrom;

generating the correction value (26) from the phase shift value (23) by the image processing apparatus (2) and transmitting the correction value (26) to the image recording apparatus (3);

a processing of the correction value (26) in the image recording apparatus (3) at least one of generating a corrected recording sync signal (27) or sending the corrected recording sync signal (27) to the image sensor (4);

following performance of the initialization method, the phase shift value (23) between the corrected recording sync signal (27) and the display sync signal (25) being smaller than an uncorrected phase shift value; and wherein the image processing apparatus (2) is used to store a phase shift threshold value (30), and at least one of the phase shift value (23) being above the phase shift threshold value (30) results in a corrected recording sync signal (27) being generated or the phase shift value (23) being below the phase shift threshold value (30) results in the initialization method being terminated.

7. The initialization method as claimed in claim 5, wherein at least one of: a respective counter (31) that is set up to generate the sync signals (24, 25) is changed in the image recording apparatus (3) and in the image processing apparatus (2), in each case based on a clock signal (28, 29) generated by a clock generator (7, 8), and matching of the sync signals (24, 25) involves the counter (31) of the image recording apparatus (3) being overwritten; or an image display clock signal (29) generated by the image processing clock generator (8) and an image recording clock signal (28) generated by the image recording clock generator (7) remain unchanged during the initialization method.

8. An image-transferring system, comprising an image processing apparatus (2) and at least one image recording apparatus (3) with an image sensor (4), and the image-transferring system is configured to perform an initialization method that comprises:

initially transferring a display image data stream (22) from an image processing apparatus (2) to the display unit (20) and transferring a recording image data stream (21) from the image recording apparatus (3) to the image processing apparatus (2);

subsequently changing over the display image data stream (22) to the recording image data stream (21) and reproducing an image recorded by the image sensor (4) or a sequence of images with the display unit (20);

prior to the step of changing over the display image data stream (22), calculating a correction value (26) for a phase shift between the display image data stream (22) and the recording image data stream (21) and transferring the correction value (26) to the image recording apparatus (3);

phase-shifting the recording image data stream (21) by the correction value (26) before the step of changing over the display image data stream (22);

the image recording apparatus (3) transmitting a recording sync signal (24) generated by the image recording apparatus (3) to the image processing apparatus (2);

the image processing apparatus (2) performing a comparison of a phase between the recording sync signal (24) and a display sync signal (25) generated in the image processing apparatus (2) independently thereof and determining a phase shift value (23) therefrom;

generating the correction value (26) from the phase shift value (23) by the image processing apparatus (2) and transmitting the correction value (26) to the image recording apparatus (3);

a processing of the correction value (26) in the image recording apparatus (3) at least one of generating a corrected recording sync signal (27) or sending the corrected recording sync signal (27) to the image sensor (4);

following performance of the initialization method, the phase shift value (23) between the corrected recording sync signal (27) and the display sync signal (25) being smaller than an uncorrected phase shift value; and wherein the at least one image recording apparatus (3) comprises at least two image recording apparatuses (3) connected to at least one of an endoscope (5), a probe, or two electronic endoscopes, and the image-transferring system is set up to perform the initialization method for each of the image recording apparatuses (3).

9. The image-transferring system as claimed in claim 8, wherein the image recording apparatus (3) and the image processing apparatus (2) each have a clock generator (7, 8) for generating a clock signal (28, 29), and a monitoring unit (10, 11), and the monitoring unit (10) of the image recording apparatus receives the clock signal (28) from the image recording apparatus clock generator (7) and generates a recording sync signal (24) therefrom, and the monitoring unit (11) of the image processing apparatus receives the clock signal (29) from the image processing apparatus clock generator (8) and generates a display sync signal (25) therefrom, and the image processing monitoring unit (11) is configured to perform a comparison of a phase between a recording sync signal (24) and a display sync signal (25) and to determine a phase shift value (23) therefrom, and the image processing monitoring unit (11) is set up to generate a correction value (26) from the phase shift value (23) and to transmit it to the image recording monitoring unit (10), and the image recording monitoring unit (10) is configured to generate a corrected recording sync signal (27) therefrom and to transmit it to the image sensor (4).

10. The image-transferring system as claimed in claim 9, wherein the image recording apparatus (3) is configured as an endoscopy device, the image sensor (4) is arranged in the electronic endoscope (13), the image processing apparatus (2) is configured as a camera control unit (14), the image recording apparatus (3) is physically separable from the image processing apparatus (2) via the image recording apparatus (3) being connectable to the image processing apparatus (2) by a data transfer line (15) for transferring at least one of an image data stream (21, 22) or a sync signal (24, 25).

11. The image-transferring system as claimed in claim 10, wherein the data transfer line comprises first and second data transfer lines, and the image recording apparatus (3) is connectable to the image processing apparatus (2) by the first data transfer line (15) for transferring the image data stream (21, 22) and the second data transfer line (15) for transferring at least one of the sync signals (24, 25), the phase shift value (23), or the correction value (26).

12. The image-transferring system as claimed in claim 10, wherein the image recording apparatus (3) has at least one of an image data stream input (16) for receiving the recording image data stream (21) of the image sensor (4) or an image data stream output (17) for forwarding the recording image data stream (21) to the image processing apparatus (2).

13. The image-transferring system as claimed in claim 10, wherein the image processing apparatus (2) has at least one of an image data stream input (18) for receiving the recording image data stream (21) from the image recording apparatus (3) or an image data stream output (19) for outputting at least one of the recording image data stream (21) or the display image data stream (22) to a display unit (20).

14. The image-transferring system as claimed in claim 10, wherein a frequency of the clock generator (7) of the image recording apparatus (3) and a frequency of the clock generator (8) of the image processing apparatus (2) differ from one another.

* * * * *